March 8, 1960 L. L. HURST, JR 2,928,012
ELECTRIC FENCE INTERFERENCE ELIMINATOR
Filed Dec. 15, 1954
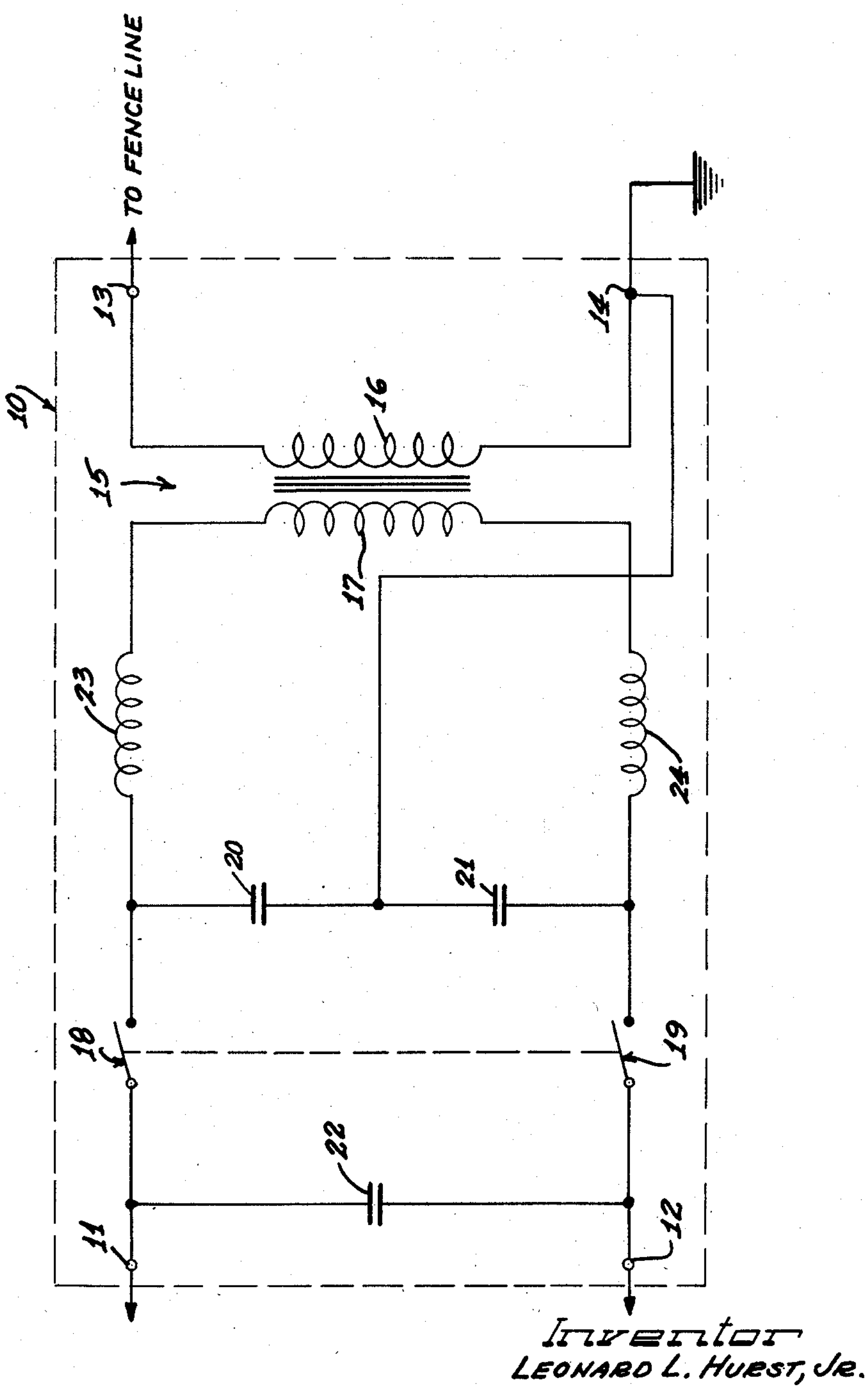
Inventor
LEONARD L. HURST, JR.
by Hill, Sherman, Meroni, Gross & Simpson Attys.

2,928,012
Patented Mar. 8, 1960

2,928,012

ELECTRIC FENCE INTERFERENCE ELIMINATOR

Leonard L. Hurst, Jr., Caldwell, Idaho, assignor to International Electric Fence Co., Inc., Caldwell, Idaho, a corporation of Washington Application December 15, 1954, Serial No. 475,377

5 Claims. (Cl. 307—105)

This invention relates to an electric fence interference eliminator and more particularly to an eliminator for minimizing interference with reception of radio and television signals in the vicinity of an electric fence controller.

The electric fence controller to which the interference eliminator of this invention may be applied may be of the type including a high voltage transformer having a secondary arranged for connection between ground and the fence line and a primary arranged for connection to a source of power, such as a source of 110 volt, 60 cycle alternating current, through intermittently operated contacts which may be thermally responsive contacts.

With this type of fence controller, high frequency signals are generated when the contacts are opened and such signals may be coupled to television and radio receivers in the vicinity through the power line or through radiation from the fence line.

In an attempt to eliminate such interference, it has therefore been proposed to connect a capacitance between the terminals of the transformer primary, preferably with two capacitors of equal value connected between each terminal of the transformer primary and ground. The capacitance so provided has served to absorb energy released when the contacts are opened, to reduce arcing at the contacts and generation of high frequency signals. Theoretically, such capacitors should have an extremely low impedance to high frequency currents and should prevent interference with radio and television receivers in the vicinity. However, it has been found in practice that such interference is not eliminated by capacitors such as described above.

It has been found that interference in the AM broadcast band (from 550 to 1600 kilocycles) is eliminated by connecting a capacitor having a relatively small capacitance between the supply lines adjacent the intermittently operated contacts, with a capacitance of 1000 micro-micro farads producing optimum results. Theoretically, this capacitance has an extremely low impedance to signals of frequencies in the television band (from about 56 megacycles to about 216 megacycles) and should prevent interference in the television range. It has been found in practice, however, that interference with television receivers in the vicinity will still exist.

According to this invention, it has been discovered that interference in the television range may be minimized by connecting at least one and preferably a pair of choke coils between the transformer primary and the intermittently operated contacts. Such choke coils serve to increase the total impedance to high frequency currents between the supply lines through the contacts, to thus reduce the flow of high frequency currents through the transformer primary and thus reduce high frequency currents in the transformer secondary and on the fence line. With this in mind, it would be expected that the interference in the television band would be decreased as the inductance of the choke coils is increased. This has been found to be true in practice up to a certain extent, but it has been found that there is a critical range of inductances for the choke coils in which interference in the television band is minimized. In particular, it has been found that with choke coils having an inductance of from 1 to 10 millihenries, the generation of interfering signals in the television band (from 56 to 216 megacycles) is minimized, and the optimum results are achieved with a value of 2.7 millihenries. The reasons accounting for this critical nature of the inductance of the choke coils are not known. The values are not substantially effected by variations in the values of other components in the circuit and the critical nature of the inductance value apparently arises from the relation of the choke coils to the contacts, transformer and fence line.

The object of this invention, accordingly, is to provide an electric fence controller or the like with means for eliminating interference with radio and television receivers in the vicinity.

This invention contemplates other objects, features and advantages which will become more fully apparent from the following detailed description taken in conjunction with the accompanying drawing which illustrates a preferred embodiment and in which the single figure is a circuit diagram of an electric fence controller utilizing the interference elimination means of this invention.

Reference numeral 10 generally designates an electric fence controller constructed according to the principles of this invention which has input terminals 11 and 12 arranged to be connected to a source of electrical power, such as a source of 60 cycle, 110 volts alternating current, and a pair of output terminals 13 and 14, the terminal 13 being arranged to be connected to a fence line and the terminal 14 being arranged to be connected to ground. Means are provided for intermittently applying a high voltage to the fence line which means includes a transformer 15 having a secondary winding 16 connected to the terminals 13 and 14 and having a primary winding 17 connected to the input terminals 11 and 12 through a pair of intermittently operated contacts 18 and 19. The transformer 15 has a construction and turns ratio such that a 15 milliampere current is applied to the fence line with 1500 volts between the terminals 13 and 14. The contacts 18 and 19 may be periodically closed by thermally responsive means such as a bi-metallic element.

As indicated previously, high frequency currents are generated from arcs developed when the contacts 18 and 19 are opened and such currents can cause interference with reception of radio and television signals in the vicinity. Such arcing, and the generation of such high frequency currents, may be reduced by the provision of a pair of capacitors 20 and 21 connected between the terminal 14 (which is connected to ground) and the terminals of the contact means 18 and 19 which are connected to the transformer primary 17. The capacitors 20 and 21 may each have a capacitance of 0.05 microfarad and serve to reduce the intensity of high frequency currents, but do not eliminate the same.

It has been found that interference with radio receivers operating on the AM broadcast band (from 550 to 1600 kilocycles) is eliminated by the provision of a capacitor 22 connected between the input terminals 11 and 12 and having a capacitance on the order of 1000 micro-micro farads. However, this capacitor does not eliminate interference in the television range (from about 56 megacycles to about 216 megacycles), but it has been found that interference in the television range is eliminated by the provision of at least 1 and preferably a pair of choke coils 23 and 24 between the contacts 18 and 19 and the transformer primary 17. It has been found that with the choke coils each having an inductance of from 1 to 10 millihenries, the generation of interfering signals in the television range is minimized, and the optimum results are achieved with the value of 2.7 millihenries.

It will be understood that modifications and variations may be effected without departing from the spirit and scope of the novel concepts of the present invention.

I claim as my invention:

1. In an electric fence controller or the like including means arranged to be connected to a fence line, intermittently operated contacts for connecting said means to a supply line, and a choke coil between said contacts and said means.

2. In an electric fence controller or the like including a transformer having primary and secondary windings and intermittently operated contact means for connecting each side of the primary winding to a supply line, a choke coil between each side of said primary winding and said contact means.

3. In an electric fence controller or the like including a transformer having primary and secondary windings and intermittently operated contact means for connecting each side of the primary winding to a supply line, a choke coil having an inductance of between 1 and 10 millihenries between each side of said primary winding and said contact means.

4. In an electric fence controller or the like including a transformer having primary and secondary windings and intermittently operated contact means for connecting each side of the primary winding to a supply line, a choke coil having an inductance of 2.7 millihenries between each side of said primary winding and said contact means.

5. In an electric fence controller including a transformer having primary and secondary windings, means for connecting one side of said secondary winding to ground, means for connecting the other side of said secondary winding to a fence line, intermittently operated contact means for connecting each side of said primary winding to a supply line, a capacitor between said contact means on the supply line side thereof, a choke coil between each side of said primary and said contact means, and a capacitor connected between ground and each choke coil on the supply line side thereof.

References Cited in the file of this patent

UNITED STATES PATENTS

| | | |
|---|---|---|
| 1,791,377 | Proskauer et al. | Feb. 3, 1931 |
| 1,817,443 | Marvel | Aug. 4, 1931 |
| 2,146,229 | Riepl | Feb. 7, 1939 |
| 2,398,442 | Moore | Apr. 16, 1946 |
| 2,594,595 | Stearns | Apr. 20, 1952 |